Aug. 12, 1958   K. SCHRÖTER ET AL   2,846,859
FREEWHEELING SAFETY CLUTCH
Filed March 28, 1957   6 Sheets-Sheet 1

INVENTORS
KURT SCHRÖTER
BERNHARD WALTERSCHEID-MÜLLER

By Toulmin & Toulmin

Attorneys

Aug. 12, 1958 K. SCHRÖTER ET AL 2,846,859
FREEWHEELING SAFETY CLUTCH
Filed March 28, 1957 6 Sheets-Sheet 2
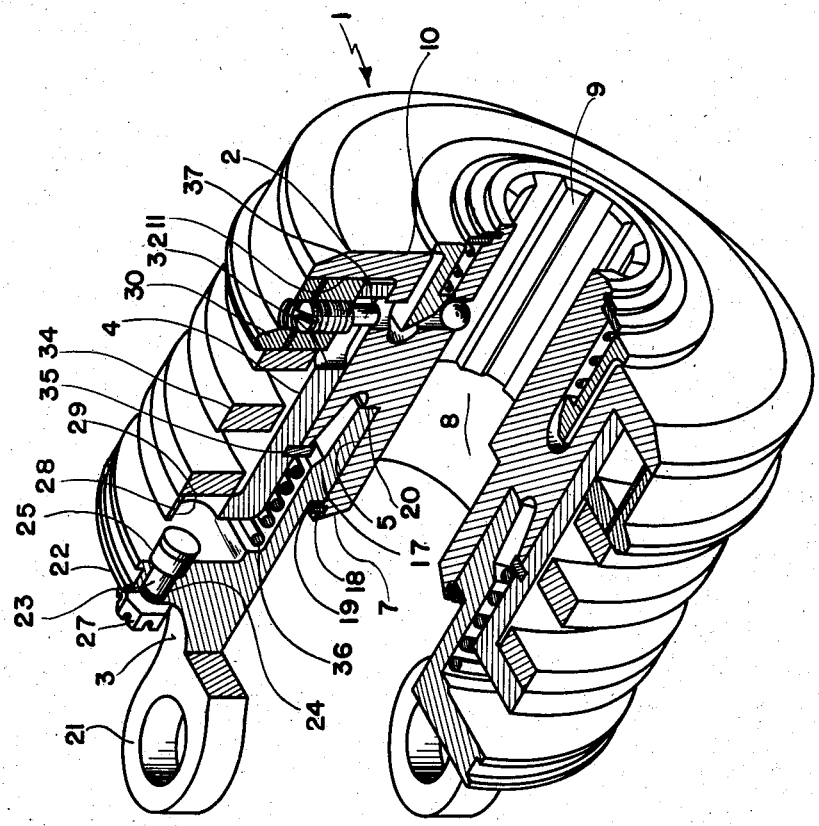
INVENTORS
KURT SCHRÖTER
BERNHARD WALTERSCHEID MÜLLER
BY *Toulmin & Toulmin*
ATTORNEYS Aug. 12, 1958

K. SCHRÖTER ET AL 2,846,859

FREEWHEELING SAFETY CLUTCH

Filed March 28, 1957

INVENTORS
KURT SCHRÖTER
BERNHARD WALTERSCHEID-MÜLLER

By *Toulmin & Toulmin*

Attorneys

INVENTORS
KURT SCHRÖTER
BERNHARD WALTERSCHEID-MÜLLER

By Taulmin & Taulmin

Attorneys

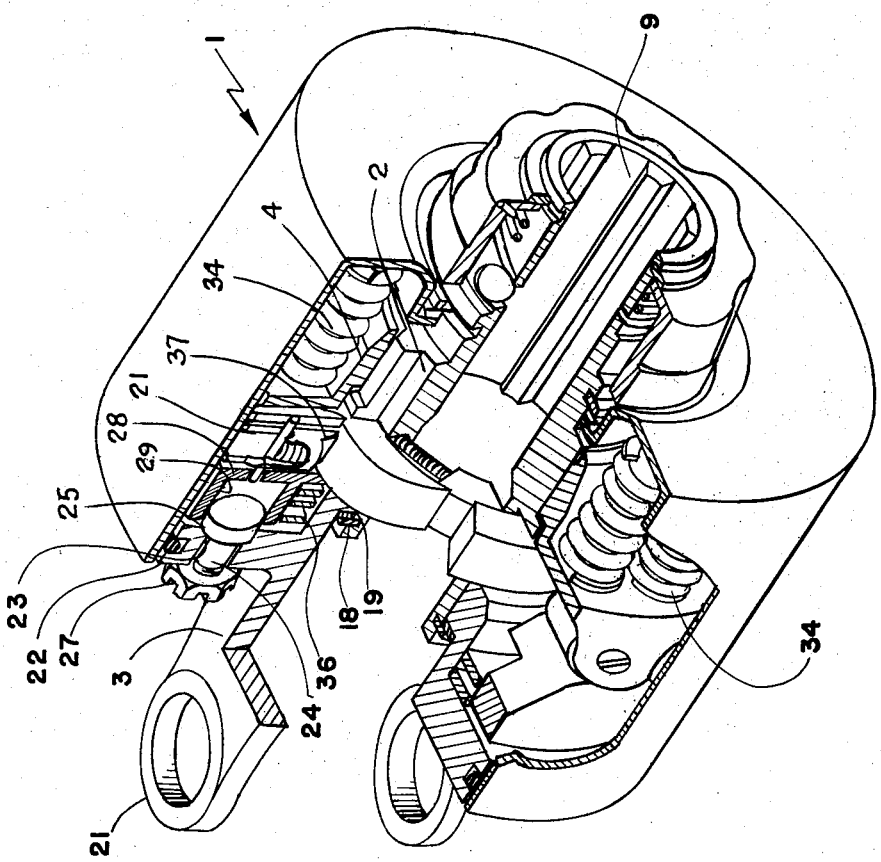

United States Patent Office

2,846,859
Patented Aug. 12, 1958

2,846,859

FREEWHEELING SAFETY CLUTCH

Kurt Schröter, Herkenrath, near Bergisch-Gladbach, and Bernhard Walterscheid-Müller, Lohmar, Siegkreis, Germany, assignors to Jean Walterscheid, Maschinenfabrik and Hammerwerk, Siegburg, Germany Application March 28, 1957, Serial No. 649,062

10 Claims. (Cl. 64—29)

The present invention relates to a safety clutch, more particularly, to a clutch in which a torque is transmitted through a spring-biased member which becomes disengaged when a predetermined torque is exceeded to enable the clutch to become freewheeling and which reengages when the difference in speed between the driven member and spring-biased member reaches a predetermined value.

It is the principal object of this invention to provide an improved safety clutch.

It is another object of this invention to provide a clutch which becomes freewheeling when a predetermined torque is exceeded.

It is a further object of this invention to provide a clutch wherein the tension in the spring maintaining the components of the clutch in engagement is controlled.

It is an additional object of this invention to provide a clutch which automatically re-engages when a predetermined difference in speeds between the clutch and driven members is reached.

It is still another object of this invention to provide a clutch wherein the forces acting upon the components transmitting the torque is reduced to a negligible amount when a maximum torque is exceeded.

It is still a further object of this invention to provide a clutch which smoothly and resiliently engages and disengages whereby the size and weight of the clutch members is considerably reduced.

Other objects and advantages of this invention will become apparent upon reference to the accompanying description when taken in conjunction with the following drawings wherein—

Figure 1A is an overall perspective view of the clutch with a portion thereof cut away to more clearly illustrate the details of construction;

Figure 9 is a perspective view similar to Figure 1A but showing a modification wherein the single main spring is replaced by a plurality of helical compression springs.

Figure 1:
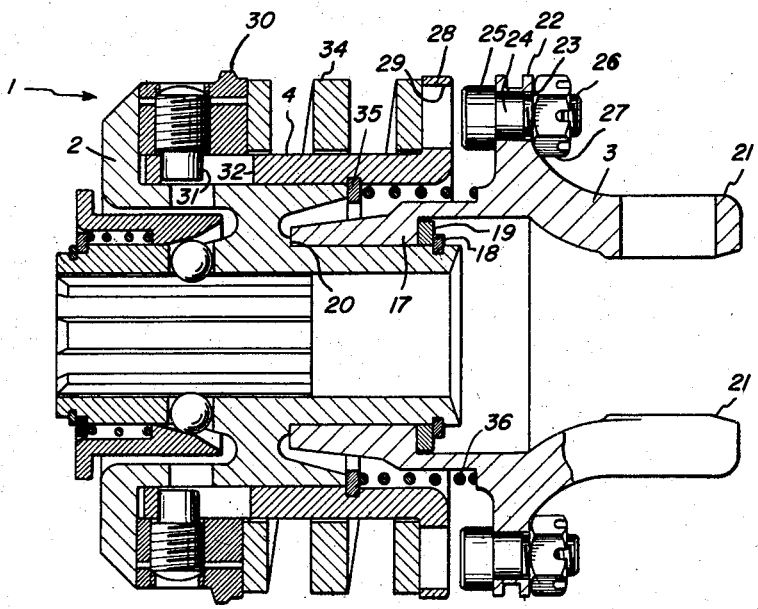
Figure 1 is a sectional view of the longitudinal axis of the free-wheeling clutch of this invention.

Returning now to the drawings and more particularly Figure 1, where like reference symbols indicate the same parts throughout the various views, 1 indicates the clutch of this invention which comprises a driving member 2, a driven member 3, and a clutch member 4.

Figure 2:
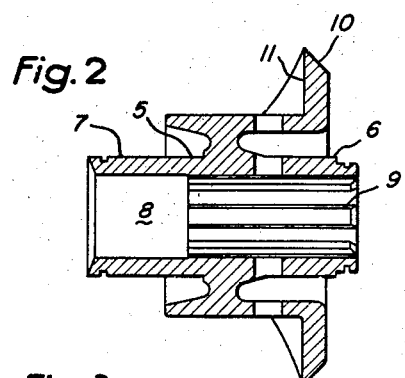
Figure 2 is a sectional view along the longitudinal axis of the driving member which is one of the components of this clutch.

The driving member 2, which is individually illustrated in Figure 2, comprises a central portion 5 having axially extending hubs 6 and 7 with a central bore 8 extending therethrough. The hub 6 has internal spines 9 for securing the driving member to a source of power. There is an external flange 10 which has an inner face 11 on one end of the driving member.

Figure 3:
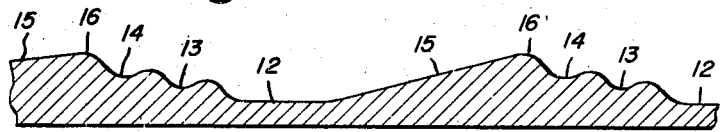
Figure 3 is a sectional view showing the profile of the cam surfaces arranged on the driving member.
Figure 4:
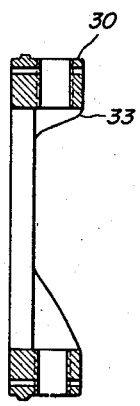
Figure 4 is a sectional view along the longitudinal axis of one of the components of the clutch which has projections to engage the cams illustrated in Figure 3.

The inner face 11 has a plurality of recesses 12 as illustrated in Figure 3. These recesses 12 have recesses of decreasing depth on one side thereof, i. e. 13 and 14 which are interconnected by cam surfaces. The other side of the recess 12 is bounded by a sloping ascending surface 15 which rises to connect a cam 16 which is positioned immediately above the recess 14. The pattern of the recesses as illustrated in Figure 3 is a profile thereof and these recesses are repeatedly annularly arranged about the inner face 11 of the driving member.

The driven member 3 comprises a hub 17 which is rotatably mounted on the hub 7 of the driving member. A plurality of collars 18 and 19 and a shoulder 20 in the hub 7 of the driving member restrain the driven member against axial movement with respect to the driving member.

A pair of arms 21 extend axially from the driven member 3 for connection to a suitable mechanism to be driven by this clutch.

The driven member 3 has an external flange 22 which has a plurality of annularly spaced holes 23 into which are inserted axially extending dogs 24 which have on one end a head 25 and on the other end threads 26 upon which are threaded nuts 27 to retain the dogs in position.

The clutch member 4 is slidably and rotatably mounted on the driving member 2. The clutch member 4 comprises at one end thereof an external flange 28 which has a plurality of annularly spaced openings 29 therein which are formed to receive the heads 25 of the dogs 24.

Figure 5:
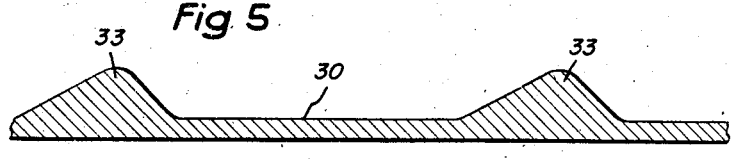
Figure 5 is a sectional view showing the profile of the projections or dogs on the part illustrated in Figure 4.

An annular engaging member or driver 30 is mounted adjacent the other end of the clutch member 4. The driver 30 is axially movable because of a construction comprising inwardly projecting pins 31 which are received in axially extending slots 32 in the clutch member 4. The face of the driver 30 has a plurality of projections or dogs 33, the profile of which is illustrated in Figure 5. The projections 33 are formed to cooperate with recesses 12 to 14 on the driving member.

A mainspring 34 maintains the driver 30 in the position as shown in Figure 1. In this position, there is no tension upon the mainspring. There is a collar 35 on the inner surface of the clutch which is engaged by an auxiliary spring 36 which urges the clutch into disengagement with respect to the dogs 24 on the driven member. The auxiliary spring 36 is considerably weaker than the mainspring 34.

As an alternative to the single mainspring construction 34, a plurality of springs may be arranged radially around the hub body of the clutch.

With respect to the operation of the clutch of this invention, the components thereof are initially in the position illustrated in Figure 1. The projections 33 on the driver 30 are on the deepest recesses 12. Hence, in this position the clutch member openings 29 are spaced from the dogs 24 in the driven member. The auxiliary spring 36 maintains the clutch member in this position.

With the application of power to the driving member 2, the driving member will rotate with respect to the clutch member 4 which will cause the driver projections 33 to become cammed into the recesses 13 and 14, respectively. This camming movement will result in axial movement of the clutch member which will result in the engagement of the openings 29 with the driven member dogs 24.

The mainspring 34 has been initially selected so that the maximum torque is transmitted when the projections 33 of the driver are in the highest recesses 14. This axial movement of the driver 30 will place some stress on the mainspring 34.

Should the maximum torque for which the mainspring 34 is selected be exceeded, the driver projections 33 will cam up and over the cam 16 and continue to move down the slope 15 into the recess of the greater depth 12. This camming movement of the driver will cause the clutch member to move axially toward the left as viewed in Figure 1 and will result in disengagement of the driven member dogs from the openings in the clutch member.

The clutch is now freewheeling since no torque is being transmitted to the driven member and the driven member is freely rotating upon the driving member 2. During this state of freewheeling, the clutch 4 is being carried by the driving member since the projections 33 of the driver 30 are resting in the recesses 12 and against the cam surface leading to the recess 13.

As the speed of the driven member decreases, power will be applied to the driving member to maintain the driven member at a desired speed. This application of power will result in the axial movement of the clutch member to the right as viewed in Figure 1 as previously described and will subsequently result in reengagement of the openings 24 in the clutch member with the dogs 24 in the driven member. Thus, the clutch is once more in engagement and power is now being transmitted from the driving member to the driver 30, through the pins 31, to the clutch member 4, to the dogs 24, and to the driven member 3.

Figure 6:
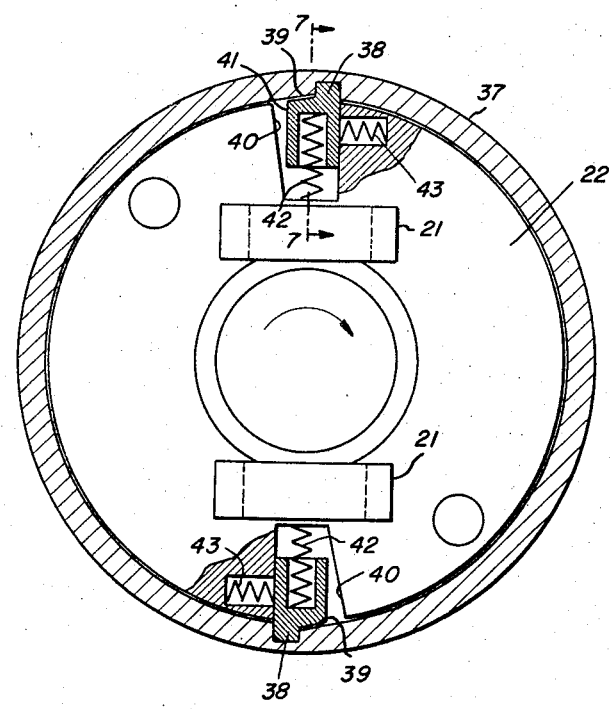
Figure 6 is a transverse sectional view of the modification of the clutch illustrated in Figure 1 with portions thereof removed to show additional details.

Proceeding next to Figure 6, there is illustrated a modification of the clutch of this invention which provides for reengagement of the clutch and driven member when a predetermined difference in rotary speeds between these two members is attained. In this modification, an axially extending sleeve 37 is affixed to the external flange 28 of the clutch member 4 and extends toward the driven member as viewed in Figure 1. There is a plurality of spaced notches 38 in the inner surface of the sleeve 37. There is a tangential slope 39 on one of the edges of each notch, as may be seen in Figure 6.

The flange 22 of the driven member 3 has a plurality of radially extending recesses 40 each of which houses a detent or locking member 41 which is urged radially by a spring 42 and tangentially by a spring 43.

Figure 7:
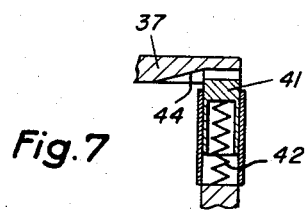
Figure 7 is a sectional view taken along the lines 7—7 of Figure 6.

Also, as may be seen in Figure 7, each notch has an axially extending slope 44 which extends toward the clutch member 4.

In the operation of this modification, the exact time of the engagement of the clutch and driven member can be predetermined.

Assuming that the clutch has been disengaged after exceeding the maximum torque which can be transmitted by the mainspring, the detents 41 are thus moving counterclockwise with respect to the sleeve 37 along the inner surface thereof. The detents will not fall into the notches 38 at high speeds because the difference between the speeds of the clutch member and the driven member is such that the detent will be forced against the sloping edge of the notch by the radial spring as the detent passes over the notch. When the difference in speed between the clutch and driven member sufficiently decreases, the detents will be urged into the notches. The clutch member now is temporarily meshed with the driven member. However, as soon as this occurs, the application of power to the driven member will immediately cause the projections 33 of the driver 30 to become cammed into the recess 14. The resulting axial movement of the clutch member will engage the clutch openings 29 with the driven member dogs 24. Simultaneously with this axial movement of the clutch, the detents will be urged out of their notches by being cammed along the sloping surface 44 in an axial direction.

The tangential spring 43 moves the detent 41 a short distance in the direction of the revolution of the clutch so as to withdraw the detent from alignment with the notches. Consequently, when predetermined torque on the clutch is exceeded and the clutch is axially moved toward the left, as seen in Figure 1, the detents 41 will not be aligned with their respective notches and the driven member will be freewheeling with the clutch member. However, as soon as the relative speed between the clutch member and the driven member reaches a predetermined amount, the detents will drop into the notches to engage temporarily the clutch in the manner previously described.

Figure 8:
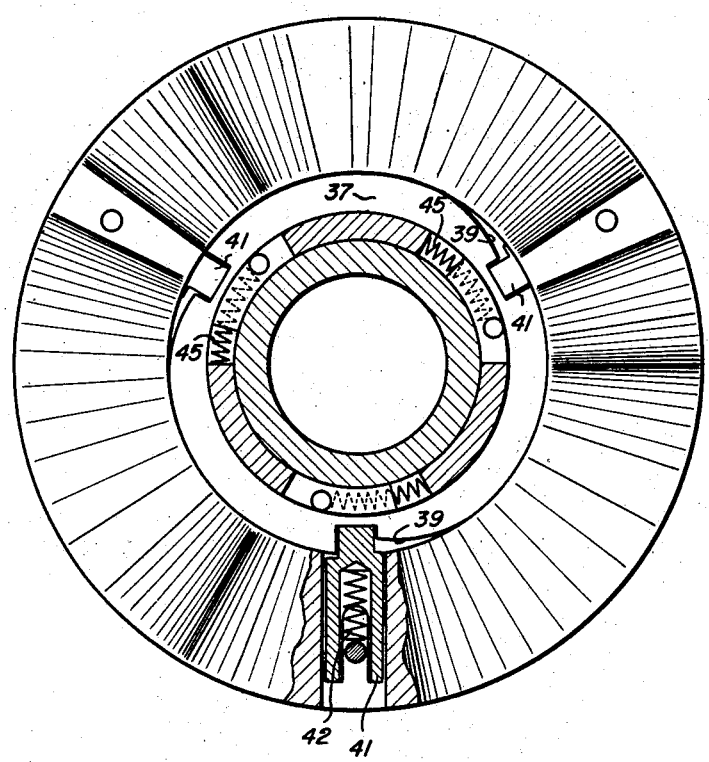
Figure 8 is a transverse sectional view of another modification of the clutch of this invention with portions thereof removed to show construction details.

It is only necessary that the cylindrical body be resilient with respect to tangentially acting forces. The same effect as described above may be achieved by utilizing the modification as illustrated in Figure 8 wherein the sleeve 37 is provided with tangentially acting springs 45 which also function to withdraw the alignment of the notches with the detents so that the driven member may be freewheeling with respect to the clutch when a predetermined torque is exceeded. The operation of the modification of Figure 8 is similar to that described for the modification of Figure 6.

Figure 9 illustrates in a perspective view similar to Figure 1A a modification of the clutch of this invention wherein the single main spring 34 is replaced by a plurality of helical compression springs 34A and the driving dogs 24. The operation of this modification is similar to the modification of the clutch as described above.

Thus it can be seen that the present invention provides a safety clutch having freewheeling and which also provides for the controlled reduction of the initial spring tension below the tension required for the torque transmission and when the limiting torque is exceeded for subsequent increase of the initial tension until the clutch is reengaged.

The clutch of this invention also provides additional locking means so that it is possible to previously determine the exact time of reengagement.

Another important feature of this clutch is that when the clutch is in the disengaged position, the mainspring is under no tension. Similarly, none of the components of the clutch which are used in the direct transmission of the torque have any forces exerted thereon. Thus, after allowing for the conventional safety factor, there is no necessity for making the clutch parts heavier and bigger to accommodate torques above a maximum predetermined torque. Thus, all of the structural elements of the clutch can be kept small and light. Furthermore, the clutch operates smoothly and resiliently and there are no shocks to be encountered in either the engagement or disengagement operations of the clutch. This also reduces damages to the clutch and enables the clutch to require a minimum of maintenance to be operative. In addition, since the operations of the clutch—engagement and disengagement—take place fully automatically, the full attention of operating personnel is reduced to a minimum.

It will be understood that this invention is susceptible to modification in order to adapt it to different usages and conditions, and, accordingly, it is desired to comprehend such modifications within this invention as may fall within the scope of the appended claims.

What is claimed is:

1. A freewheeling clutch comprising a driving member, a driven member, an intermediate clutch member for engaging said driving and driven members, means on one end of said clutch member for drivingly engaging said driven member, auxiliary spring means for urging said clutch member into disengagement from said driven member, means on the other end of said clutch member for drivingly engaging said driving member, and means coacting with said last-mentioned means for disengaging said driven member from said clutch member when a predetermined torque is exceeded.

2. A freewheeling clutch comprising a driving member having a face, there being a plurality of recesses on said driving member face, a driven member, an intermediate clutch member for engaging said driving and driven members, there being an annular member on said clutch member having a plurality of dogs for engagement with said recesses, means biasing said annular member against said recesses to drivingly engage said driving member and clutch member, and means on said clutch member to drivingly engage said driven member.

3. A freewheeling clutch as claimed in claim 2 with said recesses having varying depths.

4. A freewheeling clutch comprising a driving member, a driven member, there being a plurality of annularly arranged recesses on said driving member and having graduated depths, an intermediate clutch member rotatably and axially movable with respect to said driving and driven members, dogs on one end of said clutch member for drivingly engaging said driven member, and projections on said clutch member for engaging said recesses to axially move said clutch member whereby said dogs drivingly engage said driven member.

5. A freewheeling clutch comprising a driving member having a plurality of annularly spaced recesses thereon with an ascending sloping surface on one side thereof and a plurality of steeply ascending cam surfaces with intermediate depths forming additional recesses of decreasing depths on the other side thereof, a driven member, an intermediate clutch member rotatably and axially movable with respect to said driving and driven members, means on one end of said clutch member for drivingly engaging said driven member, an annular member having projections adapted for engagement with said recesses slidably mounted upon the other end of said clutch member, a spring on said clutch member urging said annular member so as to engage said projections with the recesses of varying depth whereby the clutch member is moved axially to engage said clutch with said driven member when power is applied to rotate said driving member, said projections becoming disengaged from said recesses when a predetermined torque is attained which overcomes the spring force engaging said projections and recesses to enable said driven member to become freewheeling and said clutch member being rotated by said driving member.

6. A freewheeling clutch comprising a driving member, a driven member, an intermediate clutch member rotatably and axially movable with respect to said driving and driven members, means on one end of said clutch member for drivingly engaging said driven member, spring means on said clutch member to drivingly engage the other end thereof with said driving member, and means dependent upon the difference in rotary speeds between said clutch member and driven member to engage said clutch and driven members after being disengaged because of exceeding a predetermined torque.

7. A freewheeling clutch comprising a driving member, a driven member, an intermediate clutch member rotatably and axially movable with respect to said driving and driven members, means on one end of said clutch member for drivingly engaging said driven member, spring means on said clutch member to drivingly engage the other end thereof with said driving member, said clutch member having a notch therein, a spring biased detent on said driven member for engaging said notch, one edge of said notch being sloped in a tangential direction whereby said detent can engage with said notch only when a predetermined difference in rotary speeds between said driven member and said clutch member is attained.

8. A freewheeling clutch comprising a driving member, a driven member, an intermediate clutch member rotatably and axially movable with respect to said driving and said driven member, means on one end of said clutch member for drivingly engaging said driven member, spring means on said clutch member to drivingly engage the other member thereof with said driving member, said clutch member having a notch therein, a spring biased detent on said driven member for engaging said notch, one edge of said notch being sloped tangentially whereby said detent can engage said notch only when a predetermined difference in rotary speeds between the driven member and the clutch member exists, said notch also having an axially extending slope whereby said detent will become disengaged from said notch during axial movement of said clutch member and driven member.

9. A freewheeling clutch comprising a driving member, a driven member, an intermediate clutch member rotatably and axially movable with respect to said driving and driven members, means on one end of said clutch member for drivingly engaging said driven member, spring means on said clutch member to drivingly engage the other end thereof with said driving member, said clutch member having a notch therein, a detent on said driven member for engaging said notch, one edge of said notch being sloped tangentially whereby said detent can engage with said notch only when a predetermined difference in rotary speeds between said driven member and said clutch member exists, said detent being spring biased both radially and tangentially.

10. A freewheeling clutch comprising a driving member, a driven member, an intermediate clutch member rotatably and axially movable with respect to said driving and driven members, means on one end of said clutch member for drivingly engaging said driven member, spring means on said clutch member to drivingly engage the other end thereof with said driving member, said clutch member having a notch therein and being spring biased tangentially, a detent on said driven member for engaging said notch, said detent being spring biased radially, one edge of said notch being sloped tangentially whereby said detent can engage with said notch only when the difference in rotary speeds between said driven member and said clutch member is reduced to a predetermined quantity.

References Cited in the file of this patent

UNITED STATES PATENTS

| | | |
|---|---|---|
| 1,913,046 | Callan | June 6, 1933 |
| 2,600,674 | Natkins | June 17, 1952 |